United States Patent [19]
Smilgys et al.
[11] 4,136,573
[45] Jan. 30, 1979

[54] EXTENDED RANGE FUEL PUMP COMPUTER PRICE VARIATOR

[75] Inventors: Bruno S. Smilgys, Hartford; Richard J. Flis, Plantsville; Raymond H. Devanney, Winsted, all of Conn.

[73] Assignee: Veeder Industries Inc., Hartford, Conn.

[21] Appl. No.: 809,991

[22] Filed: Jun. 27, 1977

[51] Int. Cl.[2] .......... F16H 3/22
[52] U.S. Cl. .......... 74/348; 74/681
[58] Field of Search .......... 74/348, 681

[56] References Cited

U.S. PATENT DOCUMENTS

| | | | |
|---|---|---|---|
| 3,413,867 | 12/1968 | Hamlin | 74/348 |
| 3,677,466 | 7/1972 | Soupenne | 74/681 X |
| 3,875,816 | 4/1975 | Wells | 74/348 |

*Primary Examiner*—Benjamin W. Wyche
*Assistant Examiner*—Frank H. McKenzie, Jr.
*Attorney, Agent, or Firm*—Prutzman, Kalb, Chilton & Alix

[57] ABSTRACT

Conversion of a fuel pump computer price variator from a three place to a four place unit volume price range and comprising an auxiliary higher place take-off shaft parallel to and having a coaxial gear in engagement with the variator cone gear, an additional summation differential mounted at the top of the variator coaxially with the cone gear and substantially within a stepped dome-like projection of a modified cost variator cover for combining an auxiliary higher place price output to the conventional three place price output, an idler gear in operative engagement with and mounted on a lever for pivotal movement about the additional summation differential for selective engagement with one or more take-off shaft driven gears, and, auxiliary price posting shutters connected to the lever for displaying the higher place price setting.

14 Claims, 6 Drawing Figures

EXTENDED RANGE FUEL PUMP COMPUTER PRICE VARIATOR

BRIEF SUMMARY OF THE INVENTION

The present invention relates generally to mechanical fuel pump computer price variators of the type disclosed in U.S. Pat. No. 3,413,867 of Richard B. Hamlin dated Dec. 3, 1968 and entitled "Variator" and employed for establishing and posting the unit volume price of gasoline within an available multiple place price range of the variator and more particularly relates to a new and improved modified mechanical variator having an extended available price range.

Because of the increasing cost of gasoline, the price for a gallon of gasoline in the not too distant future may exceed the maximum available three place unit volume price of 999 (e.g., 99.9 cents per gallon) of conventional "full" range variators in the field.

It is therefore a principal aim of the present invention to provide new and improved conversion means (of the type disclosed in U.S. Pat. No. 3,875,816 of Arthur J. Wells, dated April 8, 1975 and entitled "Extended Range Variator" and in U.K. Pat. Specification No. 1,433,177 of Kienzle Apparate GMBH, published Apr. 22, 1976, and entitled "A Calculator For Petrol Issuing Stations") for modifying conventional mechanical variators for extending their multiple place unit volume price range.

It is another aim of the present invention to provide new and improved variator conversion means of the type described which does not substantially increase the variator torque load on its driving fuel meter and which permits conversion of existing fuel pump equipment with minimum inconvenience and down time.

It is another aim of the present invention to provide new and improved variator conversion means for extending the available multiple place unit volume price range of the variator.

It is a further aim of the present invention to provide a new and improved mechanical variator having an extended multiple place unit volume price range.

It is another aim of the present invention to provide a new and improved mechanical variator settable to establish a drive ratio within a four place drive ratio range.

Other objects will be in part obvious and in part pointed out more in detail hereinafter.

A better understanding of the invention will be obtained from the following detailed description and the accompanying drawings of illustrative applications of the invention.

DESCRIPTION OF THE PREFERRED EMBODIMENTS

Figure 1:
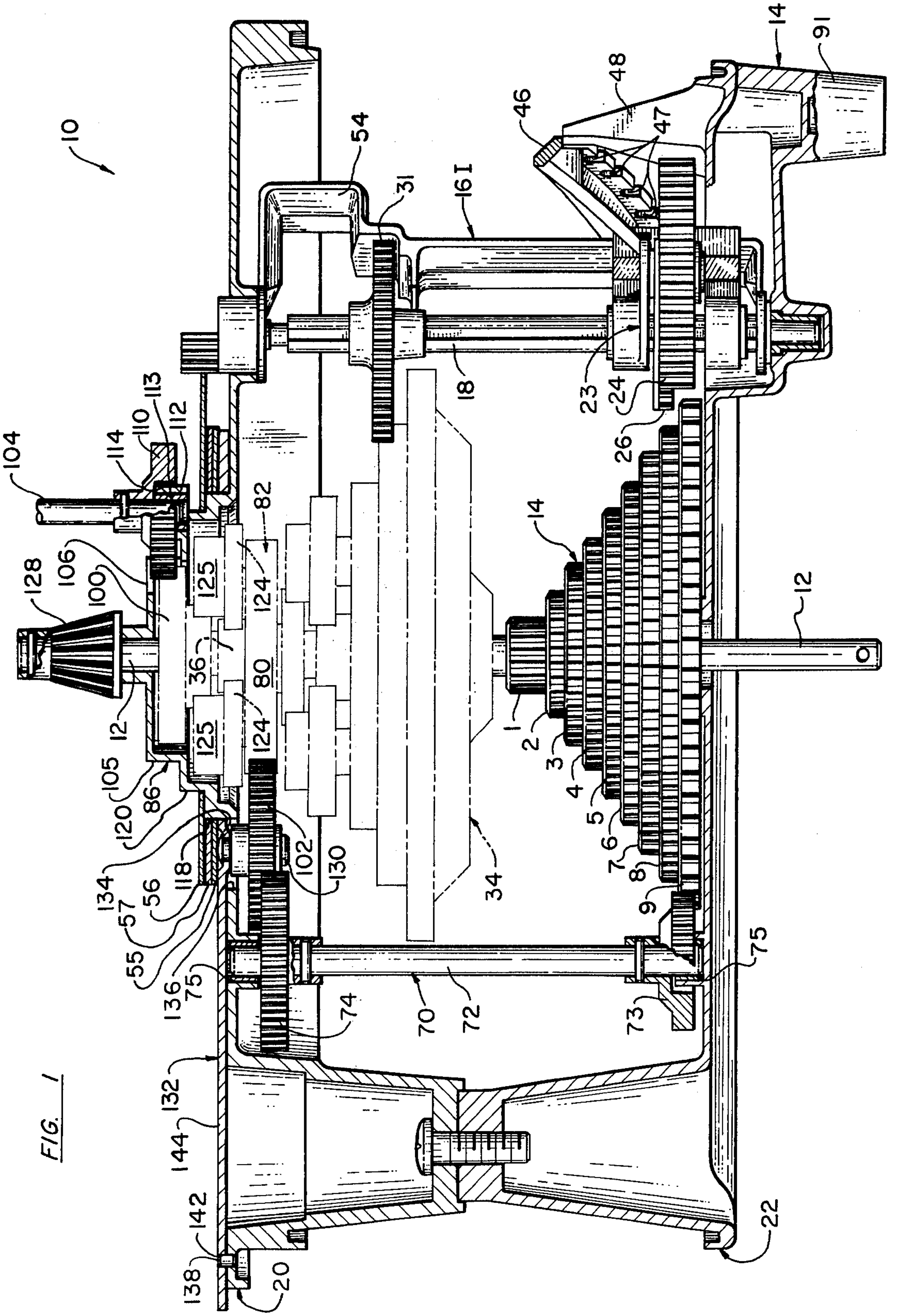
FIG. 1 is an elevation section view, partly broken away and partly in section, of a variator modified in accordance with one embodiment of the present invention.

Referring now to the drawings in detail wherein like reference numerals indicate like parts throughout the several figures, there is shown a mechanical fuel system price variator or change speed mechanism of the type disclosed in the aforementioned U.S. Pat. No. 3,413,867 and conventionally used in fuel pump computers for establishing and posting the unit volume price of gasoline within a multiple place unit volume price range (e.g., from 00.0 cents per unit volume to 99.9 cents per unit volume in one cent increments).

The variator 10 may be identical to the variator shown and described in U.S. Pat. No. 3,413,867 excepting as hereinafter described and therefore the variator 10 will not be totally described in detail herein. Briefly, however, the variator 10 comprises a center shaft 12 adapted for example to be driven by a conventional fuel meter (not shown) of a gasoline dispensing system in accordance with the volume amount of gasoline dispensed. A nine step cone gear or gear stack 14 having gear steps 1–9 with respective numbers of teeth in accordance with the arithmetic progression 1*a;* 2*a;* . . . 9*a* (e.g., 8, 16, 24 . . . 72) is mounted on the center shaft 12 for being driven by the shaft 12. Three range arm or take-off gear assemblies 16, comprising three parallel equiangularly spaced (i.e., 120° spaced) range arm shafts 18 rotatably mounted on top or cover 20 and a base 22 of a variator frame, are provided for selective engagement with the gear steps 1–9 of the cone gear 14. Each range arm assembly 16 has a range arm 23 pivotally and slideably mounted on the respective range arm shaft 18 for selective engagement of its outer idler gear 24 with each of the steps 1–9 of the central cone gear 14. An inner range arm gear 26 in mesh with the idler gear 24 is keyed to the range arm shaft 18 for rotating that shaft. Range arm output gears 30–32 are affixed to the respective range arm shafts 18 to provide inputs into a central differential summing mechanism 34 which is coaxially mounted on the variator center shaft 12 and has an output gear 36 rotatably mounted on the shaft 12.

The relative gear ratios through the three range arms 23 to the variator output gear 36, via the range arm output gears 30–32 and differential summing mechanism 34, are in accordance with the geometric progression 1*b,* 10*b,* 100*b* such that one of the range arm assemblies 16L operates as a lowest place range arm assembly to set the amount of the lowest place of a three place unit volume price, a second range arm assembly 16I operates as an intermediate place range arm assembly for setting the amount of the intermediate place of the three place unit volume price, and the remaining range arm assembly 16H operates as a highest place range arm assembly for setting the amount of the highest place of the three place unit volume price. Thus, for example, with all three range arms 23 in engagement with the lowest and largest gear step 9, the established unit volume price setting is 999 (e.g., 99.9 cents per gallon), and with all three range arms 23 in engagement with the highest and smallest gear step 1, the established unit volume price setting is 111 (e.g., 11.1 cents per gallon). Also each range arm 23 may be selectively positioned in a lower position out of engagement with the cone gear 14 and with its idler gear 24 in engagement with a fixed tooth (not shown) integrally formed on the base 22 and such that the range arm output is locked against rotation to, in effect, establish a respective place price setting of "0". Thus, it can be seen that the three range arms 23 can be selectively set into engagement with the respective fixed lockout teeth (not shown) and the cone gear steps 1-9 to establish any unit volume price setting within a multiple place price range of 000 to 999.

Each range arm 23 has a notched generally helical detent rack 46 with ten notches 47 for the ten positions of the range arm 23, and the base 22 is formed with a fixed integral detent finger 48 for each range arm for receipt within each of the ten notches 47 of the range arm 46 for accurately positioning the range arm idler gear 24 in angularly and vertically correlated positions for engagement with the respective fixed lock-out tooth (not shown) and the steps 1-9 of the cone gear 14.

The variator 10 has a set of three aligned substantially identical numeral price posting wheels 50-52 of ascending order of significance, each bearing a sequence of indicia of 0-9, on each of two opposed sides of the variator 10. The numeral wheels 50-52 are mechanically connected to bails 54 of the respective range arm assemblies 16 by pivotal toothed levers 55-57 to be angularly positioned in accordance with the pivotal positions and therefore the settings of the respective range arms 23. Also the indicia 0-9 on each numeral wheel are angularly spaced so that each set of numeral wheels 50-52 provides for posting the three place unit volume price from 000 to 999 established by the three range arm settings.

In accordance with the present invention, the variator 10 (which is more fully described in the aforementioned U.S. Pat. No. 3,413,867) is modified to expand or extend the unit volume price range of the variator from three places to four places (in the embodiment of FIGS. 1 and 2 to a maximum four place price setting of 1999) and to automatically and positively post the established unit volume price through the extended price range.

Pursuant to the present invention, an auxiliary higher place take-off shaft assembly 70 (having a shaft 72 and coaxial input and output gears 73, 74 fixed onto the shaft 72) is rotatably mounted on the base 22 and top 20 of the variator frame parallel to and radially offset from the center shaft 12. For that purpose, the base 22 and top 20 are cast with integral upstanding and depending annular flanges respectively for receiving bushings 75 for rotatably supporting the ends of the auxiliary take-off shaft 72.

In the auxiliary take-off shaft assembly 70 shown in FIGS. 1, the input gear 73 (e.g., having eighteen teeth) engages the largest cone gear step 9 (e.g., having seventy-two teeth) to provide a fixed 4:1 drive ratio from the center shaft 12 to the auxiliary take-off shaft 72. The auxiliary shaft output gear 74 (e.g., having twenty-five teeth) is adapted to be selectively connected via an idler or selector gear 102 to an input gear 80 (e.g., having thirty-two teeth) of an auxiliary summing differential 82 to provide a fixed ratio drive between the auxiliary shaft 72 and auxiliary differential 82.

The auxiliary differential 82 is mounted coaxially on the center shaft 12 essentially above the differential summing mechanism 34 and immediately below the top or cover 20 of the variator frame, and the output gear 36 of the differential summing mechanism 34 provides one of the two input gears to the auxiliary differential 82. The center shaft 12 is made longer to accomodate the auxiliary differential 82, and the frame cover 20 is integrally cast with an upstanding stepped, generally cylindrical dome or housing 86 for receiving the auxiliary differential 82 without increasing the vertical axial height of the variator between the upper and lower mounting lugs 90, 91 of the frame. For avoiding increasing the effective heighth of the variator 10, in addition to the provision of the upstanding dome or housing 86 for the auxiliary differential 82, the conventional differential mechanism 34 is modified to reduce its axial heighth by reducing the axial length of the hubs (not shown) of some of its gears. Thus, even though the heighth of the variator 10 along its axis is greater than that of a conventional non-modified variator, the modified variator according to the present invention can be readily substituted for a conventional fuel pump variator in the field with minimum modification of the other components of the fuel pump.

An output gear 100 of the auxiliary differential 82 provides a variator cost output adapted to be connected to a conventional fuel pump computer register (not shown, but which for example may be a register of the type disclosed in U.S. Pat. No. 2,814,444 of Harvey N. Bliss dated Nov. 26, 1957, and entitled "Register") for operating the usual register cost counters (not shown) for registering the cost amount of fuel dispensed in accordance with the volume amount dispensed and the multiple place unit volume price established by the variator setting.

The usual register vertical cost shaft 104 is shown in FIG. 1 to illustrate how the cost counter drive train of the register is connected to the auxiliary differential output gear 100. For that purpose, the smallest and uppermost generally cylindrical step 105 of the variator dome 86 that is dimensioned to receive the differential output gear 100, is formed with a cutout or opening 106 for engagement of the output gear 100 with a register take-off gear 110. Also, the variator dome 86 is formed with an upstanding integral bearing support sleeve 112 for receiving a bearing 113 for the vertical register cost shaft 140. Also, the register take-off gear 110 is modified to have an enlarged lower bore 114 for receiving the bearing support sleeve 112 and to have a diameter for appropriate operative engagement with the differential output gear 100.

The lower largest two generally cylindrical steps 118, 120 of the dome 86 are dimensioned to receive planetary compound gear steps 124, 125 of the auxiliary differential 82. Also, a suitable bevel gear 128 is mounted on the upper end of the variator center shaft 12 for connecting the center shaft 12 for operating the conventional register volume counters (not shown) for registering the volume amount of gasoline dispensed.

The three toothed levers 55-57 are rotatably mounted on the two lower cylindrical steps 118, 120 of the housing. Also, (for the reason explained in the aforementioned U.S. Pat. No. 3,413,867) the second cylindrical step 120 employed for rotatably mounting the intermediate toothed lever 56 is formed eccentrically of the center axis of the variator or shaft 12. However, the lowest cylindrical step 118 provided for rotatably supporting the price wheel operating levers 55, 57 is formed coaxially with the shaft 12, as is the smallest cylindrical step 105.

The auxiliary summing differential 82 is designed to provide a drive gear ratio from the center shaft 12 via the auxiliary take-off shaft assembly 70 relative to the drive or gear ratios of the conventional range arm assemblies 16 for selectively adding a higher place price of "1" to the three place price established by the setting of the three conventional range arms 23. Accordingly, as more fully explained hereinafter, a fixed auxiliary higher place price setting, in the described embodiment a higher place price setting of "1", is adapted to be selectively added to the three place price setting established by the three range arms 23.

The idler or selector gear 102 is rotatably mounted on a fixed stub shaft 130 depending from an auxiliary sheet metal lever 132 rotatably mounted on the lowest cylindrical step 118 of the cover dome 86. The idler gear 102 and auxiliary range shaft 72 are angularly positioned relative to the range arm shafts 18 so as not to interfere with the operation and pivotal and axial adjustment of the range arms 23. Also, the sheet metal lever 132 is shown formed with an offset portion 134 received within a suitable slot 136 in the variator cover 20 to permit an upper reduced end of the stub shaft 130 to be upset for securing the stub shaft 130 to the lever 132 clear of the lower price wheel operating lever 57.

Figure 2:
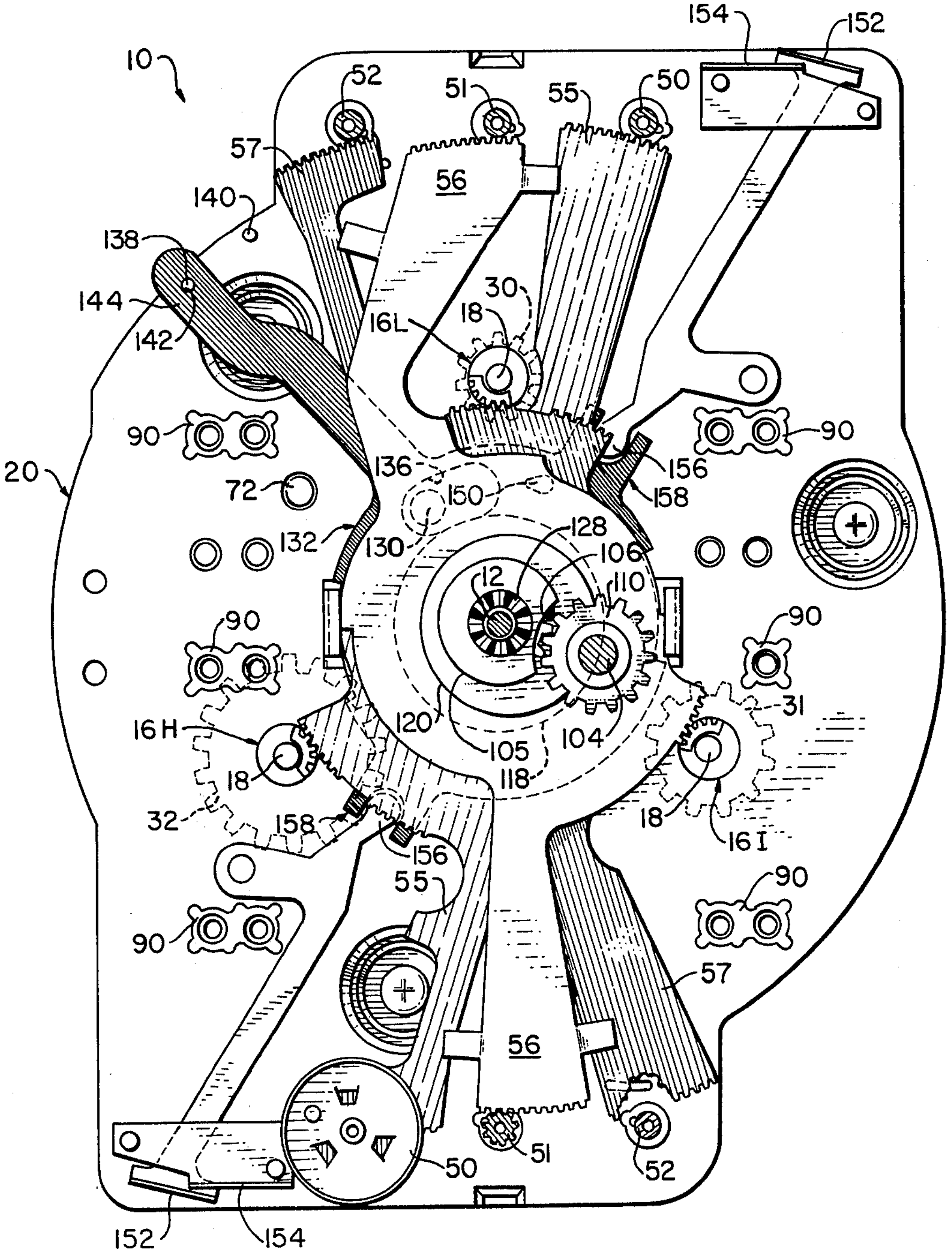
FIG. 2 is a reduced top plan view, partly broken away and partly in section, of the modified variator.

In the embodiment of FIGS. 1 and 2, the idler gear operating lever 132 has two alternative operating positions shown established by two upstanding locating pins 138, 140 secured within openings in the frame cover 20 and adapted to be selectively received within an opening 142 in a lever operating arm 144 which is made sufficiently flexible for that purpose. In a first of the lever operating positions established by the locating pin 138 the lever 132 is positively located and locked in with the idler gear 102 in engagement with the take-off shaft output gear 74, thereby completing the auxiliary higher range drive to the auxiliary differential 82 to input an auxiliary "1" higher place price setting. In the other lever operating position established by the locating pin 140, the selector gear 102 is out of engagement with the take-off shaft output gear 74 and in operative engagement with an integral depending fixed tooth 150 of the variator cover 20 (FIG. 2) to input a "0" higher place price setting into the auxiliary differential 82.

Referring to FIG. 2, an auxiliary pivotal price shutter 152 and a "1" indicator plate 154 are provided in general alignment with each set of price posting wheels 50–52 for displaying the auxiliary higher place setting established by the auxiliary gear mechanism. The "1" indicator plates 154 are suitably riveted to the variator cover 20 and the pivotal price shutters 152 are suitably pivotally mounted on the frame cover 20. The price shutters 152 have inner arms with circular ends 156 received within bifurcated radial extensions 158 of the idler gear operating lever 132 and whereby the shutters 152 are pivoted to overlie the upstanding indicator plates 154 when the idler gear 102 is in its "0" position in engagement with the fixed tooth 150. The shutters 152 thereby mask the "1" on the indicator plates 154. Of course, if desired "0" indicia could be provided on the outer face of the shutters 152 to display the "0" higher place price setting. When the idler gear 102 is in its "1" setting in operative engagement with the take-off output gear 74, the pivotal shutters 152 are withdrawn from the indicator plates 154 to display the "1" higher place setting of the auxiliary gear mechanism.

Figure 3:
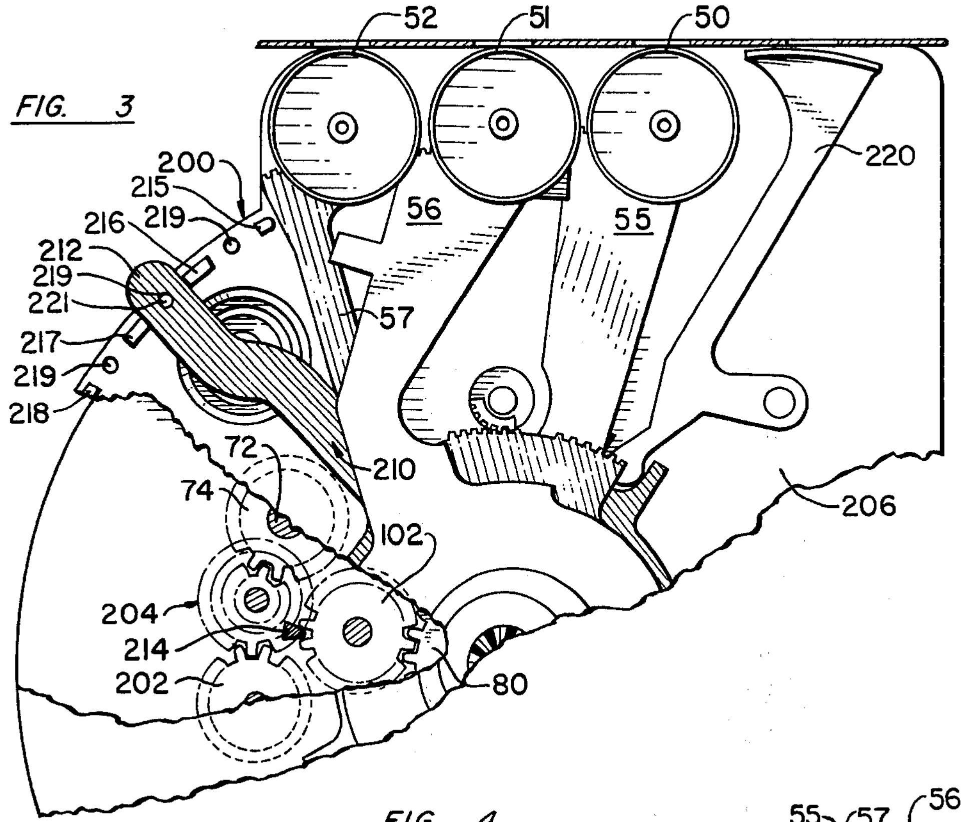
FIG. 3 is a partial top plan view, partly broken away and partly in section, of a variator modified in accordance with a second embodiment of the present invention.
Figure 4:
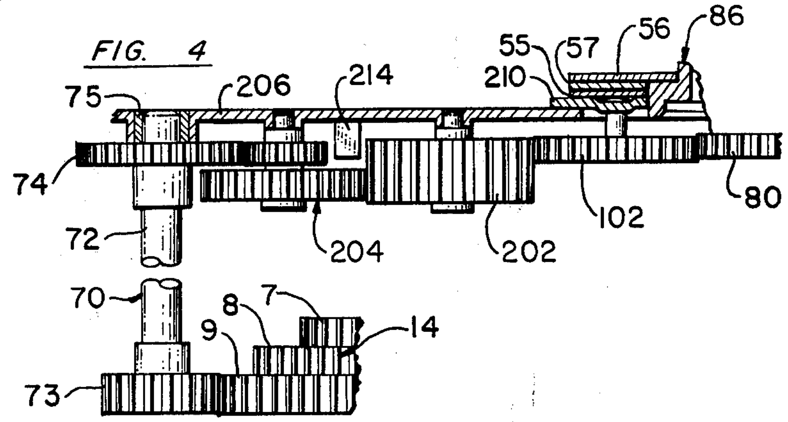
FIGS. 4 and 5 are partial enlarged elevation section views, partly broken away and partly in section, showing auxiliary higher place selection gearing of the variator embodiment of FIG. 3 in different settings thereof.
Figure 5:
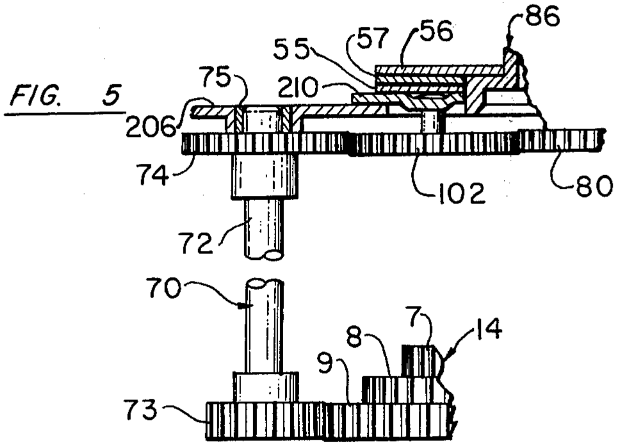

Referring to FIGS. 3–5 in a second embodiment 200 of an extended range variator incorporating the present invention, the variator is further modified to employ a second take-off shaft driven gear 202. The second drive gear 202 (e.g., having twenty-five teeth like the first drive gear 74) and a compound gear 204 intermediate the drive gears 74, 202 are rotatably mounted on respective depending stub shafts secured within bores of the frame cover 206. The compound gear 204 (e.g., having gear steps with twelve and twenty-four teeth respectively) provides for rotating the drive gear 202 in the same angular direction as the drive gear 74 and at twice the angular rate. The selector or idler gear 102 is mounted on its pivotal support lever 210 between the two angularly spaced drive gears 74, 202 and for selective and independent engagement with the drive gear 74 (as shown in FIG. 5) or drive gear 202 (as shown in FIG. 4) for establishing respectively "1" and "2" auxiliary higher place price settings. Also an integral depending lockout tooth 214 of the frame cover 206 is provided for locking the selector gear 102 at an intermediate angular position out of engagement both drive gears 74, 202 for establishing a "0" auxiliary higher place price setting.

The frame cover 206 has four fixed upstanding locating lugs 215–218 for selectively positioning the idler gear support lever 210 in each of its "1", "0", and "2" operating positions respectively, with its operating arm 212 positively located between a pair of the locating lugs 215–218. Also, the frame cover is provided with three suitable openings 219 for alignment with an opening 221 in the lever operating arm 212 for applying a suitable seal (not shown) and thereby lock the idler gear support lever 210 in place. Each lever operated shutter 220 is provided with a printed "0", "1", and "2" sequence of indicia on its outer face for displaying the auxiliary higher place price setting established by the selector gear 102. Also, the two shutters 220 (only one of which is shown in FIG. 3) are suitably aligned with the two sets of price wheels 50–52 to post the established four place price on opposite sides of the variator.

Figure 6:
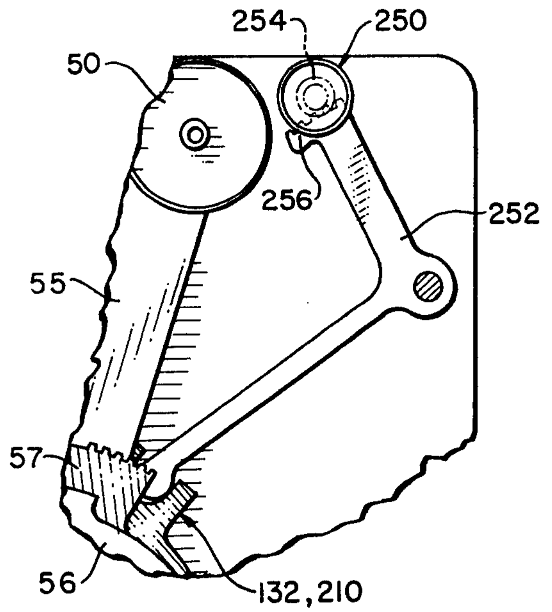
FIG. 6 is a partial top plan view, partly broken away and partly in section, showing an alternative auxiliary higher place price indicating mechanism to that shown in FIGS. 2 and 3.

The embodiment of FIGS. 1 and 2 and the embodiment of FIGS. 3–5 may be modified to employ an auxiliary higher place rotary indicator 250 as shown in FIG. 6. The auxiliary rotary indicator 250 angularly positioned by a pivotal indicator operating lever 252, for which purpose, the auxiliary indicator 250 has an integral gear 254 and its operating lever 252 has a suitable gear sector 256 in engagement with the gear 254. As shown, the auxiliary rotary indicator 250 preferably has a substantially smaller diameter than the standard price wheels 50–52 and is preferably mounted relatively close to the adjacent lower order price wheel 50 (i.e., with an axis-to-axis pitch substantially less than that between the wheels 50–52) to minimize any required modification of the associated components of the fuel pump. Also, the auxiliary indicator 250 is provided with suitably angularly spaced indicia (i.e., "0" (or blank) and "1" indicia in the embodiment of FIGS. 1 and 2, and "0" (or blank), "1" and "2" indicia in the embodiment of FIGS. 3–5) on its outer cylindrical periphery for displaying the auxiliary higher place price established by the setting of the auxiliary higher place price selector mechanism.

Also, in the embodiment of FIGS. 1 and 2, or in the embodiment of FIGS. 3–5, a take-off shaft assembly (like the take-off shaft assembly 70 but modified as necessary) could be substituted for the lowest order range arm assembly 16L to provide an extended range three place price variator. In that event, the second and third order price wheel operating levers 56, 55 are suitably modified to operate the first and second order price wheels 52, 51 respectively, the lowest order price wheel operating lever 57 is removed and the auxiliary price shutters, in the embodiment of FIGS. 1 and 2 are modified to selectively mask the third order price wheel 50 (and the wheels 50 are suitably fixed in their "1" indicating positions). In the embodiment of FIGS. 3–5, the auxiliary price shutters are suitably modified to selectively post the auxiliary higher place price settings at the third wheel position or are modified to rotate the third order price wheels 50 (and the wheels 50 are modified) to post the "1", "0", and "2" auxiliary higher place price settings.

In addition, the auxiliary differential 82 is then unnecessary, and the conventional differential summing mechanism 34 is suitably modified to give a correct decimal value to the auxiliary higher place price setting relative to the decimal values of the conventional two lower place price settings of the range arm assemblies 16I and 16H.

Further, in the embodiment of FIGS. 3–5, the second or "2" drive gear 202 can be directly driven by a second take-off shaft (not shown) instead of via the intermediate compound gear 204 for reducing the backlash in the drive train between the cone gear 14 and drive gear 202. In that event, the second or "2" take-off shaft assembly is preferably made substantially identical to the "1" take-off shaft assembly 70 described and is driven by the cone gear step 9, and a 2:1 compound selector gear (not shown, but for example like the 2:1 intermediate compound gear 204 shown in FIG. 4) is employed in place of the idler selector gear 102 with its large gear step in engagement with the differential input gear 82 and its large and small gear steps (e.g., having twenty-four and twelve teeth respectively) aligned for selective engagement with the "1" and "2" take-off shaft output gears 74.

In the embodiment of FIGS. 1 and 2 and also in the embodiment of FIGS. 3–5, the auxiliary differential 82 provides for adding the auxiliary higher place cost input (transmitted to the differential 82 via the pivotal selector gear) to the conventional three place cost input (transmitted to the differential 82 via the conventional summing differential output gear 36) to provide an extended four place variator cost output. Alternatively, a substitute auxiliary differential (not shown) can be employed for subtracting the conventional three place cost input from the auxiliary higher place cost input. In that event, the auxiliary higher place price mechanism of FIGS. 1 and 2 is modified, for example to provide a fixed "2" auxiliary higher place price setting resulting in a price range of from 1001 to 2000. Similarly, the auxiliary higher place price mechanism of FIGS. 3–5 is modified, for example to provide "1" and "2" auxiliary higher place price settings producing price range of from 0001 to 2000. Of course, the price posting wheels 50–52 and auxiliary price posting mechanism would also be modified to provide for accurately and positively posting the four place unit volume price established by the variator setting.

As will be apparent to persons skilled in the art, various modifications, adaptations and variations of the foregoing specific disclosure can be made without departing from the teachings of the present invention.

We claim:

1. In a unit volume price variator for a fuel pump computer settable for establishing the amount of each place of a multiple place unit volume fuel price and having a rotary input adapted to be rotated by a fuel meter in accordance with the volume of fuel delivered; a rotatable primary stack of gears driven by the variator input; a plurality of rotatable drive range arm assemblies for the multiple places respectively having respective rotatable range arm shafts with axes radially offset from and generally parallel to the axis of the primary gear stack, a range arm pivotally and axially shiftable on each range arm shaft for being set into selective engagement with the primary stack of gears for rotating the respective range arm shaft therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and at least one set of a plurality of price wheels for the multiple places respectively, each connected to the respective range arm assembly for displaying the amount of the respective place of the unit volume price established by the range arm setting; the improvement wherein the variator further comprises an auxiliary higher place price selector mechanism for establishing a next higher place price to said multiple place unit volume price and having an auxiliary rotatable drive take-off assembly with a rotatable take-off shaft generally parallel to and radially offset from the primary gear stack, an input gear mounted on the take-off shaft in operative engagement with one of the gears of the primary gear stack for rotating the take-off shaft therewith, and a first auxiliary higher place drive gear driven by the take-off shaft; and a rotary auxiliary differential mounted coaxially in operative engagement with said differential gear mechanism; the auxiliary higher place price selector mechanism further comprising a shiftable selector lever and a selector gear rotatably mounted on the selector lever for selectively operatively interconnecting said first auxiliary drive gear and auxiliary differential and for being shifted by the selector lever between first and second positions thereof in and out of said operative interconnection respectively; the auxiliary differential being operable for combining the rotatable drives through the differential gear mechanism and selector gear with relative drive ratios in accordance with the respective places of the unit volume price whereby the selector gear is adapted to be selectively shifted to its first position for selectively establishing a first auxiliary higher place price setting.

2. A unit volume price variator according to claim 1 further comprising auxiliary price posting means connected to be operated by the shiftable selector lever for selectively displaying said first auxiliary higher place price setting.

3. A unit volume price variator according to claim 2 wherein the auxiliary price posting means comprises a fixed higher place price indicator and a shiftable mask connected to be shifted by the shiftable selector lever for masking and unmasking the fixed indicator in the two positions respectively of the selector gear.

4. A unit volume price variator according to claim 3 wherein the auxiliary price posting means comprises a rotary indicator connected to be rotated by the selector lever to selectively indicate said first auxiliary higher place price setting.

5. A unit volume price variator according to claim 1 further comprising a second auxiliary higher place price drive gear operatively connected to be driven by the primary gear stack, the selector gear in its second position operatively interconnecting the second auxiliary drive gear and auxiliary differential for establishing a second different auxiliary higher place price setting.

6. A unit volume price variator according to claim 5 wherein said first auxiliary higher place drive gear is mounted on the take-off shaft to be directly driven thereby, and wherein the take-off shaft assembly comprises an intermediate compound gear operatively interconnecting the first and second auxiliary drive gears.

7. A unit volume price variator according to claim 1 further comprising locking means mounted for locking the auxiliary rotatable drive for establishing a "0" auxiliary higher place price setting in the second portion of the selector gear.

8. In a unit volume price variator for a fuel pump computer settable for establishing the amount of each place of a multiple place unit volume fuel price and having a frame with a lower base and an upper cover in spaced generally superimposed relationship, a rotatable drive shaft mounted to extend through the base and cover generally centrally thereof and having a lower input end adapted to be rotated by a fuel meter in accordance with the volume of fuel delivered and an upper output end adapted to be connected for operating a volume register for registering the volume of fuel delivered; a rotatable primary stack of gears mounted on the drive shaft between the base and cover for being driven by the drive shaft; a plurality of rotatable drive range arm assemblies for the multiple places respectively having respective range arm shafts rotatably mounted on the base and cover with their axes radially offset from and generally parallel to the axis of the drive shaft, a range arm pivotally and axially shiftable on each range arm shaft for being set into selective engagement with the primary stack of gears for rotating the respective range arm shaft therewith, and a range arm output gear on each range arm shaft; a rotary differential gear mechanism coaxial with and rotatably mounted on the drive shaft below the cover and above primary gear stack in engagement with the range arm output gears for combining the rotatable drives through the range arms with relative drive ratios in accordance with their respective places; and at least one set of a plurality of price wheels for the multiple places respectively, mounted on the frame cover and connected to the range arm assemblies respectively for displaying the multiple place unit volume price established by the range arm settings; the improvement wherein the variator further comprises an auxiliary higher place price selector mechanism for establishing a next higher place price to said multiple place unit volume price and having an auxiliary rotatable drive take-off assembly with a take-off shaft rotatably mounted on the base and cover generally parallel to and radially offset from the primary gear stack, input gearing in operative engagement with one of the gears of the primary gear stack for rotating the take-off shaft therewith, and a first auxiliary higher place drive gear driven by the take-off shaft; and a rotary auxiliary differential rotatably mounted on the drive shaft below the frame cover and above the differential gear mechanism in operative engagement therewith; the auxiliary higher place price selector mechanism further comprising a pivotal selector lever mounted above the frame cover coaxially with the auxiliary differential; a selector gear below the frame cover rotatably mounted on the pivotal selector lever in operative engagement with the auxiliary differential and shiftable by the selector lever between first and second positions thereof in and out of operative engagement respectively with said first auxiliary higher place drive gear; the auxiliary differential being in operative engagement with the differential gear mechanism and selector gear for combining the rotatable drives therethrough with relative drive ratios in accordance with the respective places of the unit volume price whereby the auxiliary selector gear is adapted to be selectively shifted to its first position for selectively establishing a first auxiliary higher place price setting.

9. A unit volume price variator according to claim 8 wherein the frame cover has a generally central dome rotatably supporting the variator drive shaft and generally receiving the auxiliary differential.

10. A unit volume price variator according to claim 9 wherein the frame cover dome has an outer generally cylindrical section coaxial with the variator drive shaft and wherein the selector lever is pivotally mounted on said generally cylindrical section of the cover dome.

11. A unit volume price variator according to claim 9 wherein the frame cover dome has a plurality of steps of successively decreasing size, wherein the auxiliary differential has a rotary output gear mounted on the drive shaft generally within an upper step of the frame cover dome and said upper step has an angularly extending access opening for operative engagement with said rotary output gear.

12. In a unit volume price variator for a fuel pump computer settable for establishing the amount of each place of a multiple place unit volume fuel price and having a frame with a lower base and an upper cover in spaced generally superimposed relationship, a rotatable drive shaft mounted to extend through the base and cover generally centrally thereof and having a lower input end adapted to be rotated by a fuel meter in accordance with the volume of fuel delivered and an upper output end adapted to be connected for operating a volume register for registering the volume of fuel delivered; a rotatable primary stack of gears mounted on the drive shaft between the base and cover for being driven by the drive shaft; a plurality of rotatable drive range arm assemblies for the multiple places respectively having respective range arm shafts rotatably mounted on the base and cover with their axes radially offset from and parallel to the axis of the drive shaft, a range arm pivotally and axially shiftable on each range arm shaft for being set into selective engagement with the primary stack of gears for rotating the respective range arm shaft therewith, and a range arm output gear on each range arm shaft; a rotary differential gear mechanism coaxial with and rotatably mounted on the drive shaft below the cover and above the primary gear stack in engagement with the range arm output gears for combining the rotatable drives through the range arms with relative drive ratios in accordance with the respective places of the multiple place price; and at least one set of a plurality of price wheels for the multiple places respectively of the multiple place price, mounted on the frame cover and connected to the range arm assemblies respectively for displaying the multiple place unit volume price established by the variator range arm settings; the improvement wherein the variator further comprises an auxiliary higher place price mechanism establishing a next higher place price to said multiple place unit volume price and having an auxiliary rotatable drive take-off assembly with a take-off shaft rotatably mounted on the base and cover generally parallel to and radially offset from the primary gear stack, an input gear mounted on the take-off shaft in operative engagement with one of the gears of the primary gear stack for rotating the take-off shaft therewith, and an auxiliary higher place drive gear mounted on the take-off shaft for being driven thereby; and a rotary auxiliary differential rotatably mounted on the drive shaft above the differential gear mechanism and below the frame cover in operative engagement with said differential gear mechanism and operative connection with said auxiliary higher place drive gear; the auxiliary differential being operable for combining the rotatable drives through the differential gear mechanism and auxiliary drive gear with relative drive ratios in accordance with the respective places of the unit volume price whereby the auxiliary higher place price mechanism establishes an auxiliary higher place price setting.

13. In a unit volume price variator for a fuel pump computer settable for establishing the amount of each place of a multiple place unit volume fuel price and having a rotary input adapted to be rotated by a fuel meter in accordance with the volume of feed delivered; a rotatable primary stack of gears driven by the variator input; a plurality of rotatable drive range arm assemblies for the multiple places respectively having respective rotatable range arm shafts with axes radially offset from and generally parallel to the axis of the primary gear stack, a range arm pivotally and axially shiftable on each range arm shaft for being set into selective engagement with the primary stack of gears for rotating the respective range arm shaft therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and at least one set of plurality of price wheels for the multiple places respectively, each connected to the respective range arm assembly for displaying the amount of the respective place of the unit volume price established by the range arm setting; the improvement wherein the variator further comprises a supplementary higher place price selector mechanism for establishing a next higher place price to said multiple place unit volume price and having a supplementary rotatable drive take-off assembly with a rotatable take-off shaft generally parallel to and radially offset from the primary gear stack, an input gear mounted on the take-off shaft in operative engagement with one of the gears of the primary gear stack for rotating the take-off shaft therewith, and supplementary higher place drive gear means driven by the take-off shaft; and a rotary supplementary differential mounted coaxially in operative engagement with said differential gear mechanism; the supplementary higher place price selector mechanism further comprises a shiftable selector lever and selector gear means rotatably mounted on the selector lever for selectively operatively interconnecting said supplementary higher place drive gear means and supplementary differential and for being shifted by the selector lever between first and second positions thereof into different first and second said operative interconnections respectively; the supplementary differential being operable for combining the rotatable drives through the differential gear mechanism and selector gear means with relative drive ratios in accordance with the respective places of the unit volume price and the selector gear means being operable to be selectively shifted to its said first and second positions for selectively establishing different first and second supplementary higher place price settings respectively.

14. A unit volume price variator according to claim 13 further comprising supplementary price posting means having a rotary higher place price indicator connected to be operated by the shiftable selector lever for selectively displaying said first and second supplementary higher place price settings.

* * * * *